United States Patent [19]
Farrington et al.

[11] Patent Number: 5,821,876
[45] Date of Patent: Oct. 13, 1998

[54] COMMUNICATION INTERFACE FOR BUS CONNECTED CIRCUIT BREAKERS

[75] Inventors: Ronald Lee Farrington; Larry James Serbousek; Andy Allen Haun; Earl John Tessmer, all of Cedar Rapids, Iowa

[73] Assignee: Square D Company, Palatine, Ill.

[21] Appl. No.: 772,998

[22] Filed: Oct. 8, 1991

[51] Int. Cl.⁶ .................................................. G05B 23/02
[52] U.S. Cl. ................................. 340/825.17; 340/825.18; 340/825.06; 340/825.07; 340/52; 340/310.06; 340/639; 307/4 D; 307/132 E; 361/191
[58] Field of Search ....................... 340/825.17, 638, 340/639, 825.18, 825.22, 825.52, 310 A, 825.5, 825.16, 310.06; 307/112, 113, 115, 117, 131, 132 E, 38, 40, 86; 335/14; 361/68, 115, 171–175, 189–191

[56] References Cited

U.S. PATENT DOCUMENTS

| | | | |
|---|---|---|---|
| 3,842,249 | 10/1974 | Geyer et al. | 307/86 |
| 4,175,238 | 11/1979 | Breimesser et al. | 307/40 |
| 4,308,511 | 12/1981 | Borona | 335/14 |
| 4,338,647 | 7/1982 | Wilson et al. | 361/68 |
| 4,467,314 | 8/1984 | Weikel et al. | 340/825.22 |
| 4,535,332 | 8/1985 | Miller et al. | 340/825.06 |
| 4,556,882 | 12/1985 | Brifman et al. | 340/825.16 |
| 4,780,872 | 10/1988 | Masuda et al. | 340/825.52 |
| 4,819,180 | 4/1989 | Hedman et al. | 340/310 A |
| 4,918,566 | 4/1990 | Brodsky et al. | 361/191 |
| 4,996,646 | 2/1991 | Farrington | 307/132 E |

Primary Examiner—Jeffery Hofsass
Assistant Examiner—Andrew Hill
Attorney, Agent, or Firm—Larry I. Golden; Kareem M. Irfan

[57] ABSTRACT

The present invention provides a circuit breaker control arrangement that is reliable, accurate and cost-effective to manufacture, install and maintain. This circuit breaker arrangement also provides increased modularity by alleviating the need for installing wires to connect each circuit breaker with the control station. The present invention uses circuit breakers that contain internal control technology for interrupting and establishing an associated current path. At least one coded signal designates each circuit breaker, and a communication bus carries these coded signals to each circuit breaker. Decoding technology located on each circuit breaker determines whether the coded signal corresponds to that circuit breaker. If the coded signal does correspond to that circuit breaker, then the decoding technology responds by sending the appropriate response signal over the communication bus, and the circuit breaker's internal control technology either interrupts or establishes the associated current path.

17 Claims, 6 Drawing Sheets

COMMUNICATION INTERFACE FOR BUS CONNECTED CIRCUIT BREAKERS

BACKGROUND OF THE INVENTION

The present invention relates generally to circuit breakers and, more particularly, to communication schemes for controlling circuit breakers.

DESCRIPTION OF THE RELATED ART

Accurate and cost-effective circuit breaker control is becoming increasingly important in many applications. For example, circuit breaker control in energy management applications has become significantly more important in terms of service and sales. Proper circuit breaker control arrangements can provide tangible benefits with respect to equipment performance and maintenance. Specifically, these benefits include savings of manufacturing, maintenance and energy costs, improved equipment utilization, and increased system reliability. Effective circuit breaker control designs therefore provide increased sales and profits.

While numerous circuit breaker control arrangements have been designed with the above objectives in mind, each has compromised cost and/or performance. One of the most popular arrangements, for example, includes running communication wires between a control station and circuit breakers in a load center. The circuit breakers are controlled between "make" (on) and "break" (off) states using signals passed from the control station to the circuit breakers.

Cost and performance problems with wiring circuit breakers in this manner concern manufacturing, installation and maintenance. For instance, the many wires that are required in this arrangement are expensive, and the labor involved in their installation and maintenance is extensive. Additionally, an increasing number of applications require smaller structures in which the circuit breakers must be installed, not allowing room for such conventional wiring.

Accordingly, there is need for a circuit breaker control arrangement which overcomes these deficiencies.

SUMMARY OF THE INVENTION

A general object of the present invention is to provide a circuit breaker control arrangement that is reliable, accurate and cost-effective to manufacture, install and maintain.

Another object of the present invention is to provide a circuit breaker control arrangement that alleviates the need for installing wires to connect each circuit breaker with the control station and, thus, increases the modularity of the circuit breaker arrangement. In alleviating that need, it is a more specific object of the present invention to provide a circuit breaker control arrangement which employs a multidrop-like communication scheme.

In one preferred embodiment, these and other objects of the present invention are realized using a multiple circuit breaker arrangement. Each of these circuit breakers contains internal control technology that interrupts and establishes an associated current path. At least one coded signal designates each circuit breaker, and a communication bus carries these coded signals to each circuit breaker. Decoding technology located on each circuit breaker determines whether the coded signal corresponds to that circuit breaker. If the coded signal does correspond to that circuit breaker, then the decoding technology responds by sending the appropriate response signal over the communication bus, and the circuit breaker's internal control technology either interrupts or establishes the associated current path.

BRIEF DESCRIPTION OF THE DRAWINGS

Other objects and advantages of the invention will become apparent upon reading of the following detailed description and upon reference to the drawing in which.

Figure 1:
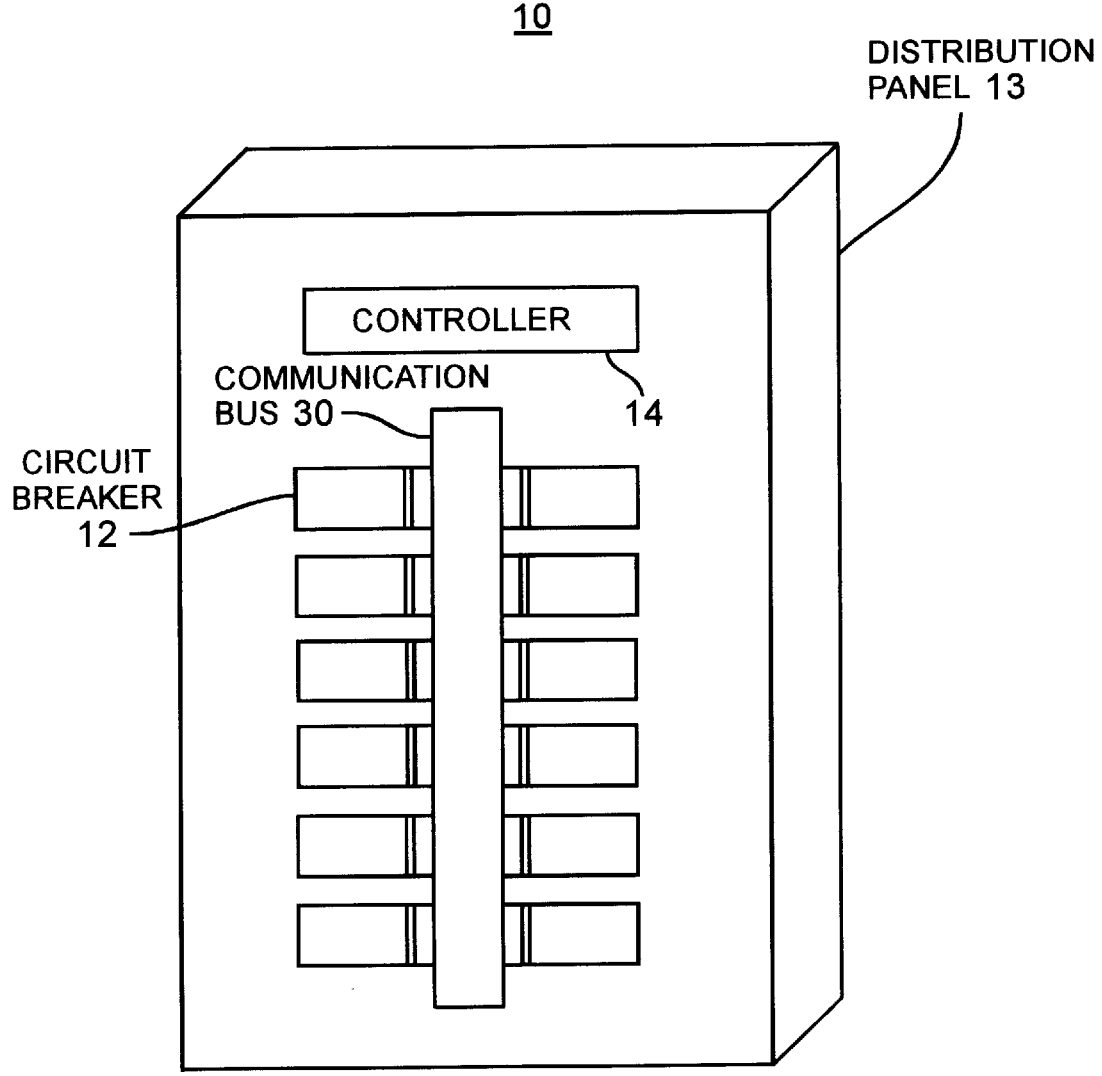
FIG. 1 shows a general block diagram of a circuit breaker arrangement which incorporates the present invention.

While the invention is susceptible to various modifications and alterative forms, specifics thereof have been shown by way of example in the drawings and will be described in detail. It should be understood, however, that it is not intended to limit the invention to the particular embodiment described. On the contrary, the intention is to cover all modifications, equivalents, and alternatives falling within the spirit and scope of the invention as defined by the appended claims.

DESCRIPTION OF THE PREFERRED EMBODIMENT

In accordance with the present invention, a circuit breaker control arrangement provides a communication scheme that advantageously eliminates significant costs and inefficiencies of other systems in the prior art.

Figure 1A:
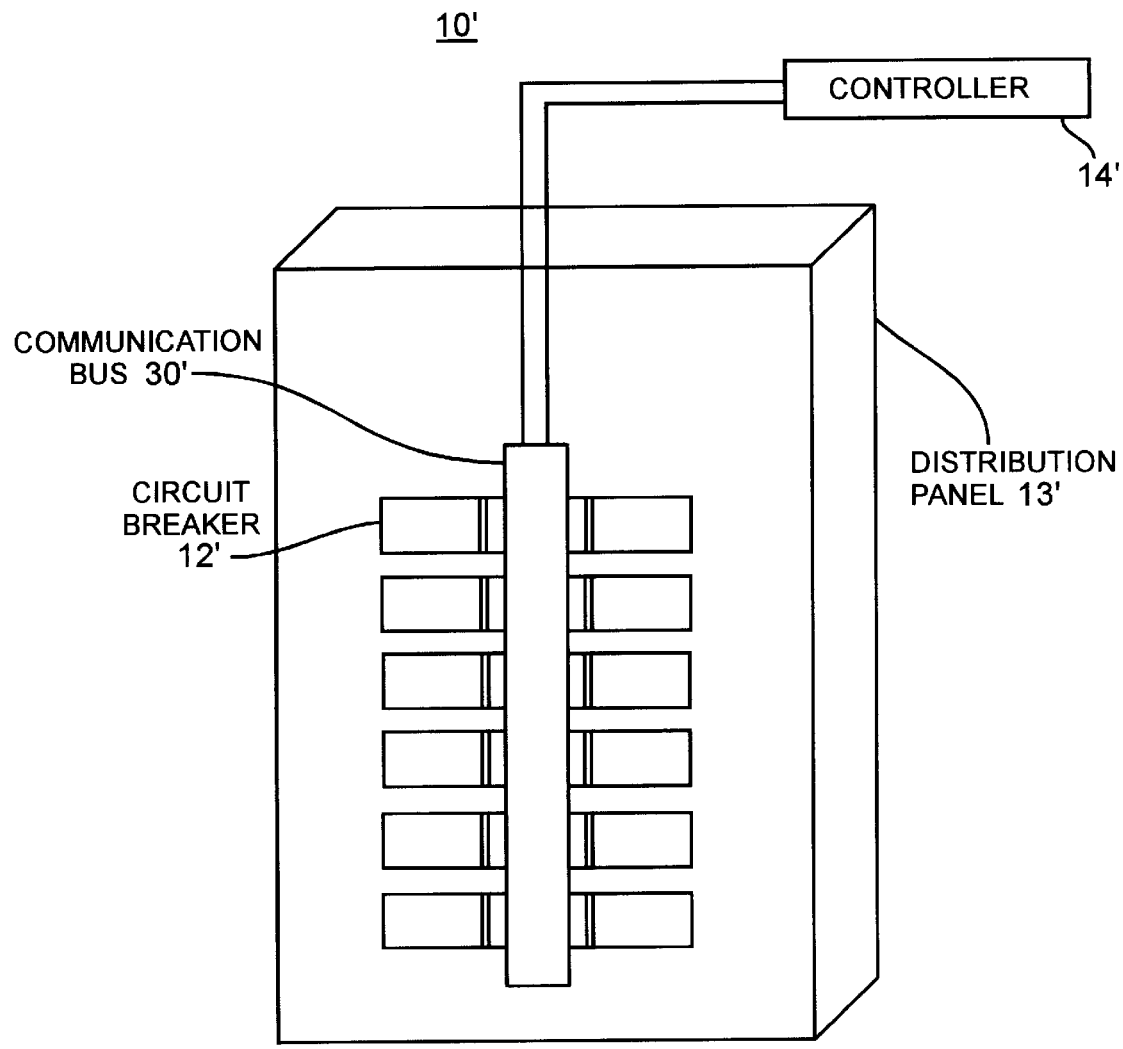
FIG. 1A shows an alternative implementation for arrangement of FIG. 1.

Such an arrangement is illustrated in FIG. 1, where there is shown a multiple circuit breaker arrangement generally designated 10. The arrangement 10 comprises a bank of circuit breakers 12, a communication bus 30, a controller 14, and a distribution panel 13. The circuit breakers are coupled to a communication bus 30 to allow controller 14 to control the circuit breakers via the communication bus 30. As shown, controller 14 may be located inside (FIG. 1) or outside (FIG. 1A) of the distribution panel 13 depending on the application. Reference numbers 10', 12', 13', 14', 30' in FIG. 1A correspond to reference numbers 10, 12, 13, 14, 30 in FIG. 1, for the purpose of illustrating the embodiment in which a controller is located outside of a distribution panel as shown in FIG. 1A. The arrangement 10 provides for circuit breaker control and removes the inconvenience and waste of separate control lines typically used in conventional circuit breaker control systems.

Figure 2:
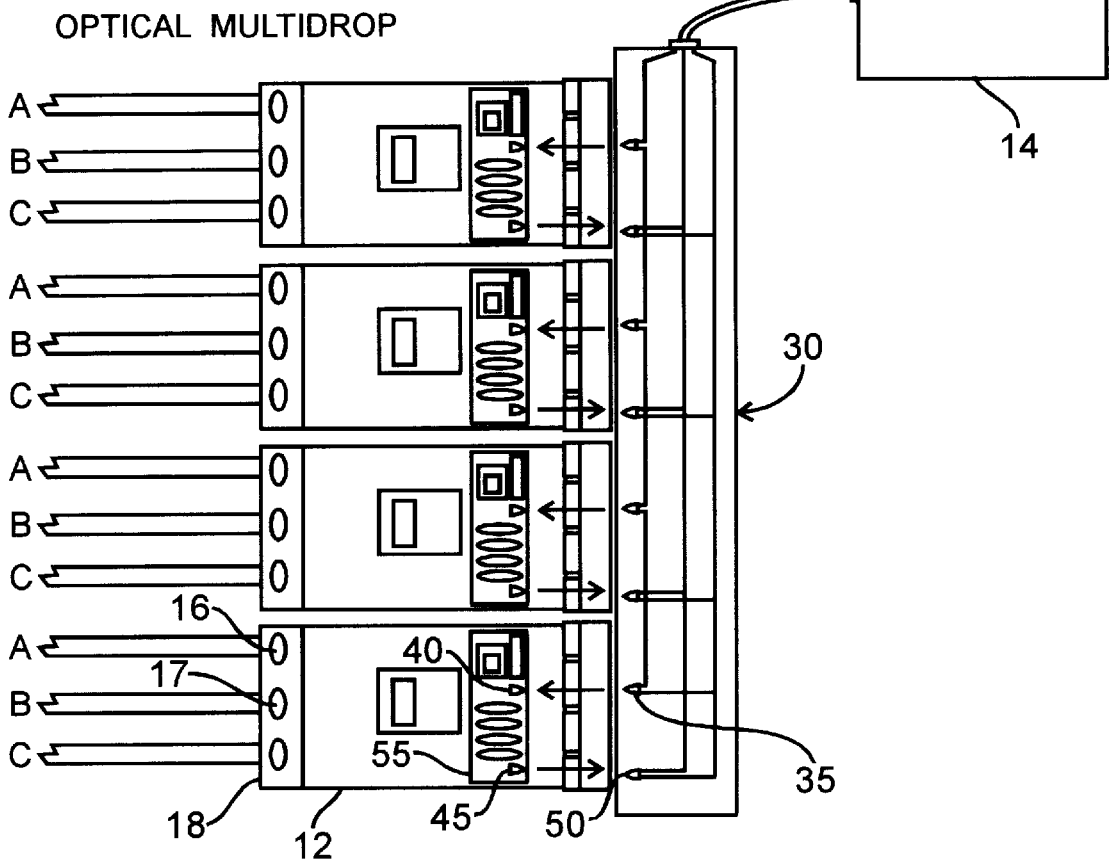
FIG. 2 is a view of a communication interface between multiple circuit breakers and a controller, where the circuit breakers are optically coupled to the communication bus, according to the present invention.
Figure 3:
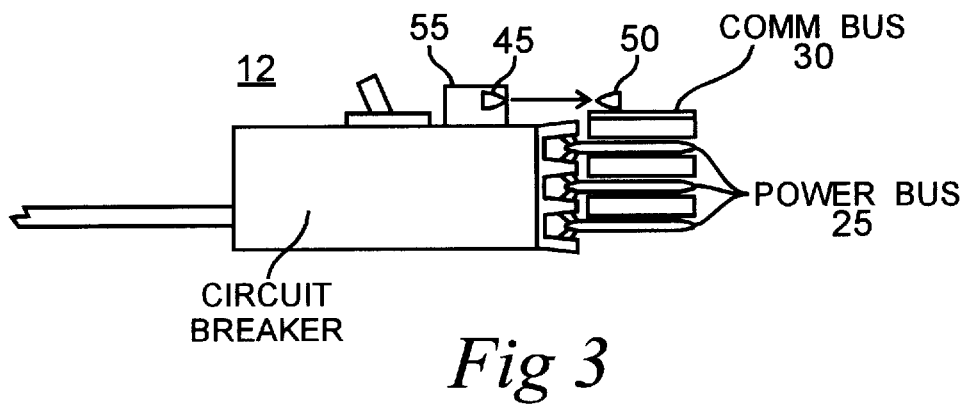
FIG. 3 is a side view of one of the circuit breakers shown in FIG. 2.

FIG. 2 illustrates an optical multidrop circuit breaker system which incorporates a preferred embodiment of the present invention. System includes circuit breakers 12 with power terminals 16, 17 and 18. Each circuit breaker 12 connects to a power bus 25 via conventional power bus mounting methods (FIG. 3). A decoding circuit 55 is mounted on each circuit breaker 12 to sample the incoming code sequences from the controller 14 and to initiate a response signal to controller 14. System includes more particularly optical devices 35, 40, 45 and 50 to optically couple circuit breaker 12 with communication bus 30. The optical devices provide electrical isolation and protect decoding circuit 55 and the electronic circuit breaker control systems from damaging electrical signals and eliminate the need for mechanical contacts. The optically coupled circuit breaker 12 communicates with controller 14 through the communication bus 30.

The controller 14 initiates the communication by sending a code sequence through communication bus 30 to optical device 35 which is connected to communication bus 30. Optical device 35 optically emits the code sequence to optical device 40, which is connected to decoding circuit 55. Decoding circuit 55 determines whether the code sequence corresponds to circuit breaker 12 using conventional digital technology. If the code sequence does not correspond to a particular circuit breaker 12, nothing happens because the code sequence designates another circuit breaker. If the code sequence corresponds to circuit breaker 12, then decoding circuit 55 responds through optical device 45 by optically signalling optical device 50, which is connected to communication bus 30. The response signal travels through communication bus 30 and alerts controller 14 that the proper circuit breaker 12 has received the controller's previous code sequence.

Figure 4:
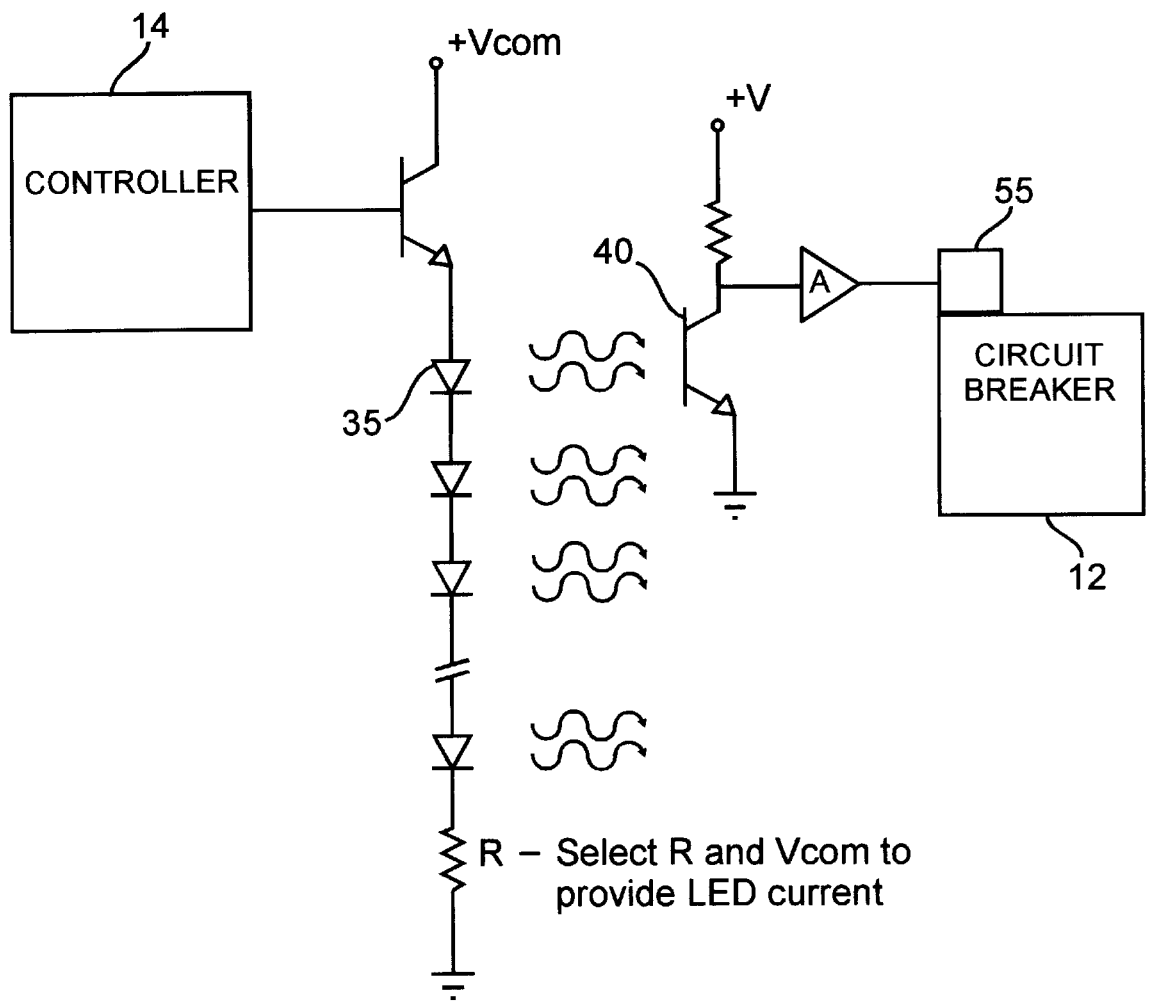
FIG. 4 is a detailed diagram of the optical coupling from the controller to the circuit breaker.

FIG. 4 illustrates a manner in which optical devices 35 and 40 of FIG. 2 optically couple communication bus 30 with circuit breaker 12 for the purpose of controller to circuit breaker communication. Controller 14 drives a bank of series LED's on the communication bus 30. A light-emitting diode 35 (LED 35) is optically matched up with a receiving photo transistor 40. The transistor 40 signal is amplified and converted into digital levels by setting a proper collector voltage. Decoding circuit 55 interprets the digital signals and determines if controller 14 sent the proper code sequence for that circuit breaker.

Figure 5:
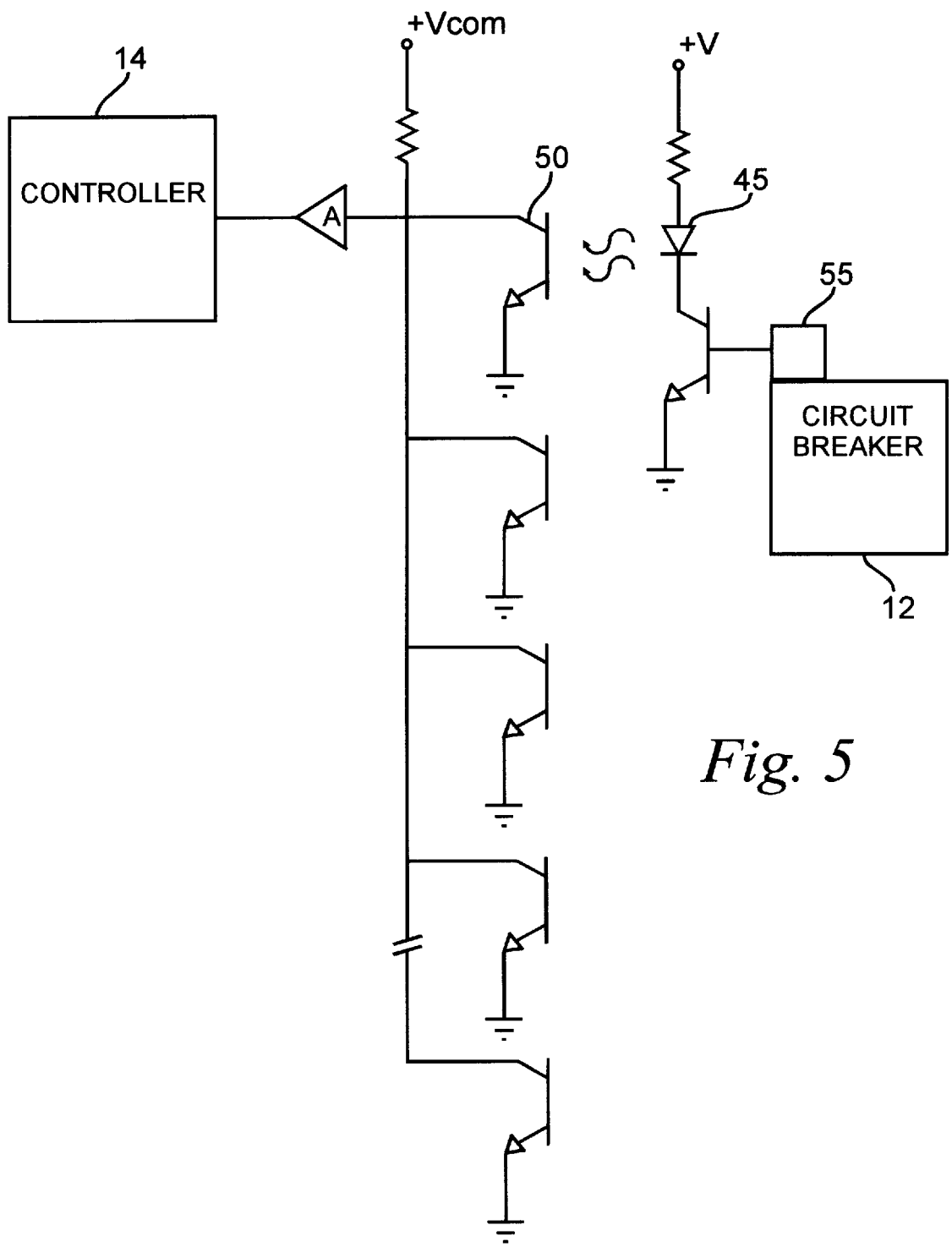
FIG. 5 is a detailed diagram of the optical coupling from circuit breaker to the controller.

If controller 14 transmitted the designated code sequence for circuit breaker 12, the decoding circuit 55 will initiate a response to alert controller 14 that circuit breaker 12 has received the transmission. FIG. 5 shows how optical devices 45 and 50 of FIG. 1 may couple circuit breaker 12 with communication bus 30. Decoding circuit 55 drives LED 45, which is optically matched up with receiving photo transistor 50. The transistor is one of a bank of parallel open collector photo transistors on the communication bus 30. When LED 45 activates photo transistor 50, the subsequent voltage change alerts controller 14 that the designated circuit breaker 12 received the code sequence.

Figure 6:
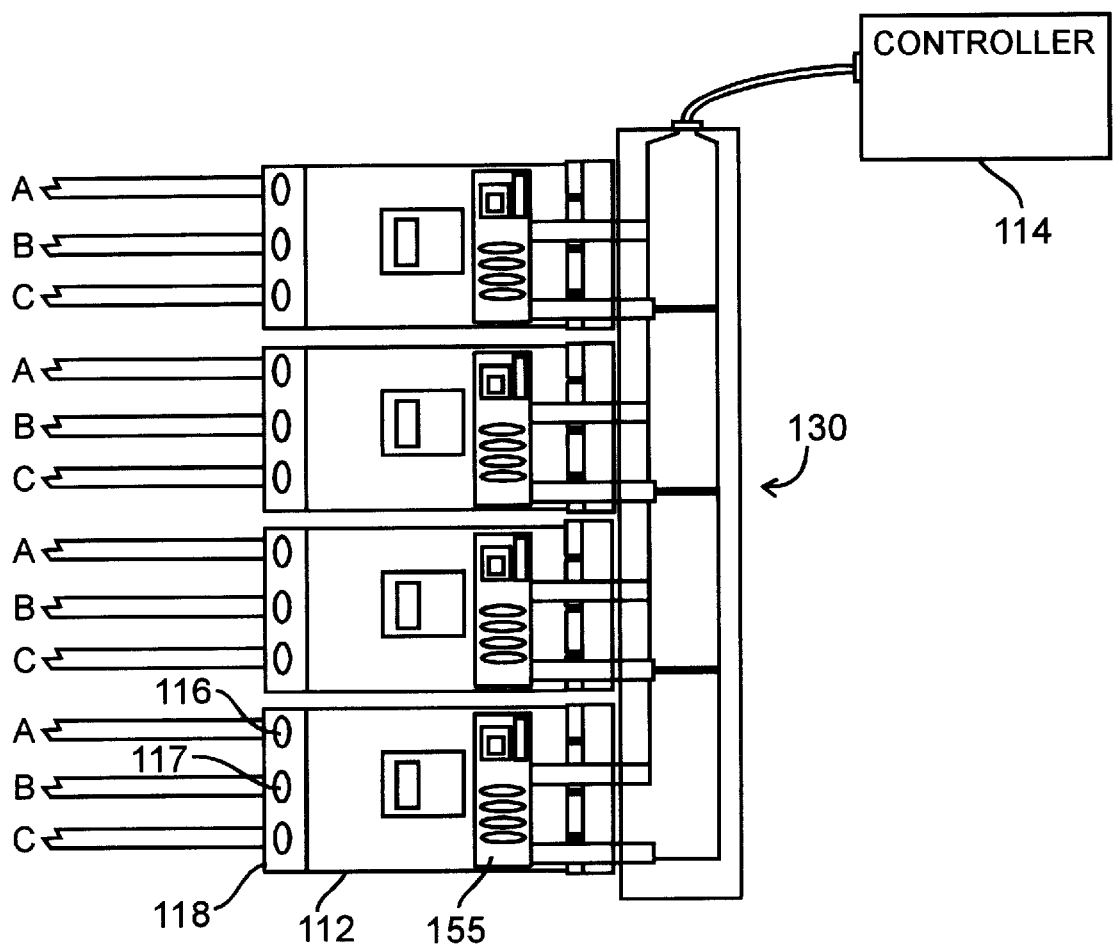
FIG. 6 shows the communication interface between multiple circuit breakers and a controller, where the circuit breakers are physically connected to the communication bus, according to the present invention.

FIG. 6 illustrates a preferred embodiment which uses physical connectors 60 and 65 in place of the optical devices 35, 40, 45 and 50 of FIG. 2. The controller 114 sends a code sequence through the communication bus 130 to initiate the control communication. The code sequence passes through the physical connection 60, and the decoding circuit 155 directly samples the code sequence to determine if the code sequence corresponds to circuit breaker 112. If the code sequence corresponds to circuit breaker 112, then decoding circuit 155 responds through physical connection 65 to the controller 114 via the communication bus 130.

The communication scheme of the present invention does not require the expense, space and time of running communication lines between a controller and the controlled circuit breakers (or other switching devices, such as relays). Instead, the circuit breakers are coupled to a communication bus through which a controller sends code sequences to designated circuit breakers. This modular scheme also allows for easy maintenance and installation of additional circuit breakers.

The sophistication of the controller provides for a variety of possible applications. The controller may range from a remote switchboard to a personal computer with the proper serial interface that controls multiple circuit breakers arrangements requiring synchronized control. The circuit breakers of the embodiments may include a wide variety of circuit breakers that employ conventional electronic control systems. An example of an appropriate circuit breaker for the embodiments may be found in Erickson et al. (U.S. Pat. No. 4,623,859), incorporated herein by reference.

While the invention has been particularly shown and described with reference to particular embodiments, those skilled in the art will recognize that modifications and changes may be made to the present invention described above without departing from the spirit and scope thereof. For example, an embodiment of the invention may comprise optical isolation devices located exclusively on the circuit breakers, replacing the LED/photo transistor combinations, to provide the optical coupling between the circuit breakers and the communications bus.

We claim:

1. A communication interface system for circuit breakers which are connected to a power bus in a circuit breaker distribution panel, the system comprising:

a plurality of circuit breakers mounted within the circuit breaker distribution panel, wherein each of said circuit breakers is designated by at least one coded signal and each of said circuit breakers includes means for interrupting and establishing an associated current path and includes decoding means for decoding its designated coded signal and returning a response signal;

a data communication bus, arranged adjacent the plurality of circuit breakers and within the distribution panel, for carrying coded signals to and from the associated circuit breaker's decoding means; and a plurality of coupling means, each of said coupling means located within the distribution panel and physically connected to the data communication bus and an associated circuit breaker and arranged for coupling the associated circuit breaker's decoding means to the data communication bus.

2. The system according to claim 1, wherein a controller directs the circuit breakers to interrupt and establish the associated current path by transmitting and receiving the designated coded signals.

3. The system according to claim 2, wherein the circuit breaker distribution panel includes means therein for mounting the controller and each of the circuit breakers.

4. The system according to claim 1, wherein each said decoding means sends the response signal on the data communication bus.

5. The system according to claim 1, wherein each said decoding means for decoding and responding to a coded signal is accomplished with a synchronous digital circuit that properly decodes the incoming coded signal and properly transmits a response signal.

6. The system according to claim 1, wherein said data communication bus comprises:

a transmission line for carrying the coded signals to each circuit breaker's decoding means; and a response line for carrying the response signal from the circuit breaker's decoding means after receiving the coded signal designated for that circuit breaker.

7. The system according to claim 1, wherein each said coupling means includes optical isolation means.

8. The system according to claim 7, wherein said optical isolation means comprise:
   a light-emitting diode (LED) and a receiving photo transistor for data communication bus to circuit breaker transmissions where the LED is connected to the data communication bus and the receiving photo transistor connects to said decoding means for decoding the coded signal; and
   an LED and a receiving photo transistor for circuit breaker to data communication bus transmissions where the LED is connected to said decoding means for responding to a designated coded signal and the receiving photo transistor connects to the data communication bus.

9. The system according to claim 7, wherein the data communication bus includes a transmission line for carrying the coded signals to the circuit breakers and the optical isolation coupling means include LED's and associated drivers connected at locations along the transmission line where a circuit breaker is optically coupled to the data communication bus; and
wherein the data communication bus includes a response line for carrying the circuit breaker return response signals and the optical isolation coupling means include photo transistors and associated drivers connected at locations along the response line where a circuit breaker is optically connected to the data communication bus.

10. The system according to claim 7, wherein each said optical isolation means includes:
   a first opto-isolation arrangement, located on the associated circuit breaker, for data communication bus to circuit breaker transmission, where the first opto-isolation arrangement includes a photo-receiving component which connects to said decoding means of the associated circuit breaker, and and includes a photo transmitting component which makes contact with the data communication bus; and
   a second opto-isolation arrangement, located on the associated circuit breaker, for circuit breaker to data communication bus transmission, where the second opto-isolation arrangement includes a photo-transmitting component which connects to said decoding means of the circuit breaker and includes a photo receiving component which makes contact with the communication bus.

11. The system, according to claim 10, wherein the data communication bus comprises:
   a transmission line for carrying coded signals to each decoding means such that the transmission line makes contact with the first opto-isolation arrangement's photo transmitting component; and
   a response line for carrying a response signal transmitted by a selected one of the decoding means such that the response line makes contact with the associated second opto-isolation arrangement's photo receiving component.

12. A circuit breaker arrangement, comprising:
   a plurality of mountable circuit breakers wherein each of said circuit breakers is designated by at least one coded signal, includes means for interrupting and establishing an associated current path, and includes decoding means for decoding and the designated coded signal;
   a distribution panel having means for mounting each of said mountable circuit breakers within said panel;
   a data communication bus for carrying coded signals to and from the said circuit breakers;
   a plurality of coupling means, including optical isolation means, for coupling each circuit breaker to the data communication bus, including:
   a light-emitting diode (LED) and a receiving photo transistor for data communication bus to circuit breaker transmissions where the LED is connected to the data communication bus and the receiving photo transistor connects to the decoding means for decoding the coded signal,
   an LED and a receiving photo transistor for circuit breaker to data communication bus transmissions where the LED is connected to the decoding means for responding to a designated coded signal and the receiving photo transistor connect to the data communications bus.

13. A circuit breaker arrangement, comprising:
   a plurality of circuit breakers wherein each of said circuit breakers is designated by at least one coded signal, each of said circuit breakers including means for interrupting and establishing an associated current path and including decoding means for decoding its designated coded signal and for returning a response signal;
   a distribution panel having means for mounting each of said circuit breakers within said panel;
   a controller, located proximate the distribution panel, for directing said circuit breakers to interrupt and establish the associated current path by serially transmitting and receiving the designated coded signals;
   a data communication bus for two-way communication between each decoding means and the controller; and
   a plurality of coupling means, including optical isolation means, for coupling each circuit breaker's decoding means to the data communication bus.

14. The circuit breaker arrangement, according to claim 13, wherein the controller comprises:
   a serial interface with the data communication bus for transmitting coded signals over the data communication bus to the circuit breakers and for receiving the response signals from the circuit breakers;
   a means for generating the proper coded signals that are transmitted through the serial interface, over the data communication bus and to the circuit breakers such that the decoding means on each circuit breaker may decode the coded signal; and
   a means for sampling the data communication bus for a response signal from the circuit breaker designated by the controller's coded signal.

15. The circuit breaker arrangement, according to claim 13, wherein each said decoding means for decoding and responding to the coded signals is accomplished with a synchronous digital circuit that properly decodes the incoming coded signal and properly transmits a response signal.

16. The circuit breaker arrangement, according to claim 13, wherein each said decoding means sends the response signal on the data communication bus.

17. The circuit breaker arrangement, according to claim 13, wherein said optical isolation means comprises:
   a light-emitting diode (LED) and a receiving photo transistor for data communication bus to circuit breaker transmissions where the LED is connected to the data communication bus and the receiving photo transistor connects to the decoding means for decoding the coded signal; and
   an LED and a receiving photo transistor for circuit breaker to data communication bus transmissions where the LED is connected to said decoding means for responding to a designated coded signal and the receiving photo transistor connects to the data communication bus.

* * * * *